(12) United States Patent
Khan et al.

(10) Patent No.: US 9,729,546 B2
(45) Date of Patent: Aug. 8, 2017

(54) AUTO-CORRECTING CREDENTIALS FOR NETWORK SUBSCRIBER EQUIPMENT

(71) Applicant: Pace PLC, West Yorkshire (GB)

(72) Inventors: Ayaz Khan, San Jose, CA (US); Anibal Rodriguez Orozco, San Jose, CA (US)

(73) Assignee: ARRIS Global Ltd., West Yorkshire (GB)

( * ) Notice: Subject to any disclaimer, the term of this patent is extended or adjusted under 35 U.S.C. 154(b) by 44 days.

(21) Appl. No.: 14/338,163

(22) Filed: Jul. 22, 2014

(65) Prior Publication Data

US 2015/0033308 A1 Jan. 29, 2015

Related U.S. Application Data

(60) Provisional application No. 61/857,424, filed on Jul. 23, 2013.

(51) Int. Cl.
| | | |
|---|---|---|
| *G06F 21/31* | (2013.01) | |
| *H04L 29/06* | (2006.01) | |
| *H04L 29/12* | (2006.01) | |

(52) U.S. Cl.
CPC .......... *H04L 63/0853* (2013.01); *G06F 21/31* (2013.01); *H04L 63/08* (2013.01); *H04L 63/102* (2013.01); *H04L 61/203* (2013.01); *H04L 61/2061* (2013.01)

(58) Field of Classification Search
CPC ................................. G06F 21/31; H04L 63/08
See application file for complete search history.

(56) References Cited

U.S. PATENT DOCUMENTS

| | | | | |
|---|---|---|---|---|
| 6,012,088 A | * | 1/2000 | Li | G06F 9/44505 709/219 |
| 7,340,769 B2 | * | 3/2008 | Baugher | G06F 21/10 713/151 |
| 7,451,224 B1 | * | 11/2008 | Stamler | H04L 41/0846 709/228 |
| 2002/0004935 A1 | * | 1/2002 | Huotari | H04L 12/12 717/170 |

(Continued)

OTHER PUBLICATIONS

The Broadband Forum, TR-069 CPE WAN Management Protocol v1.1, Amendment 2; Dec. 2007; pp. 1-138.

(Continued)

*Primary Examiner* — Jason C Chiang
(74) *Attorney, Agent, or Firm* — Bart A. Perkins

(57) ABSTRACT

A network communication system includes a computing device, which includes a processor, a memory device, and a component management module. The component management module is configured to receive a message from customer-premises equipment (CPE). The component management module is also configured to determine from the message that the CPE is operating in a captive portal. The captive portal restricts Internet access to the CPE. The component management module is configured to obtain stored connection credential values corresponding to a subscriber in response to determining that an identification parameter of connection credentials associated with the CPE is valid for the subscriber. The component management module is also configured to provide the stored values to the CPE.

12 Claims, 4 Drawing Sheets

(56) References Cited

U.S. PATENT DOCUMENTS

| | | | | |
|---|---|---|---|---|
| 2004/0205201 | A1* | 10/2004 | Katsube | H04L 41/0803 709/229 |
| 2005/0102408 | A1* | 5/2005 | Nakamura | H04L 12/2859 709/228 |
| 2006/0059092 | A1* | 3/2006 | Burshan | H04L 29/06 705/51 |
| 2009/0049048 | A1* | 2/2009 | Justen | H04Q 3/0095 |
| 2009/0063689 | A1* | 3/2009 | Camille | H04L 63/102 709/227 |
| 2009/0296566 | A1* | 12/2009 | Yasrebl | H04L 41/5087 370/221 |
| 2010/0119050 | A1* | 5/2010 | Kuo | H05K 1/162 379/201.12 |
| 2011/0243115 | A1* | 10/2011 | Chen | H04W 8/245 370/338 |
| 2011/0275362 | A1* | 11/2011 | Nitta | H04W 76/04 455/422.1 |
| 2012/0204241 | A1* | 8/2012 | Varsavsky Waisman-Diamond | H04L 29/12367 726/5 |
| 2013/0137402 | A1* | 5/2013 | Ergen | H04W 12/04 455/411 |
| 2014/0047510 | A1* | 2/2014 | Belton | H04L 9/32 726/4 |

OTHER PUBLICATIONS

Cisco Prime Home Overview and Use Cases New Possibilities in Broadband Deployments, White Paper; Jan. 2013; pp. 1-14.

* cited by examiner

AUTO-CORRECTING CREDENTIALS FOR NETWORK SUBSCRIBER EQUIPMENT

CROSS-REFERENCE TO RELATED APPLICATION

This application is entitled to the benefit of provisional U.S. patent application Ser. No. 61/857,424, filed Jul. 23, 2013, entitled "Auto-Correcting Credentials for Network Subscriber Equipment," which is incorporated by reference herein.

BACKGROUND

When connecting to the Internet through a network communication system such as an Internet service provider (ISP) or other service provider, subscriber-specific credentials are typically assigned to each subscriber so that the subscriber is required to authenticate devices operating on the network. Service providers may include digital subscriber line (DSL) and cable services, for example. Equipment located at the premises of the subscriber, commonly referred to as customer-premises equipment (CPE), authenticates with the ISP network before being able to access the Internet.

The CPE is typically a modem on the premises of the subscriber that communicates with devices and systems operated by the service provider. In some cases, the credentials at a CPE may change so that the CPE no longer authenticates properly with the service provider network. This prevents the subscriber from being able to access the Internet because the CPE credentials do not match the credentials stored by the service provider for the subscriber. The service provider network may require the CPE credentials to be corrected before allowing the CPE to access the Internet.

SUMMARY

Embodiments of a system are described. In one embodiment, the system is a network communication system. The network communication system includes a computing device, which includes a processor, a memory device, and a component management module. The component management module is configured to receive indication message from customer-premises equipment (CPE). The component management module is also configured to determine that the CPE is operating in a captive portal. The captive portal restricts Internet access to the CPE. The component management module is also configured to obtain stored connection credential values corresponding to a subscriber in response to determining that an identification parameter of connection credentials associated with the CPE is valid for the subscriber. The component management module is also configured to provide the stored values to the CPE. Other embodiments of a system are also described.

Embodiments of a method are also described. In one embodiment, the method is a method for operating a subscriber network. The method includes receiving a message from a CPE. The method includes determining from the message that the CPE is operating in a captive portal. The method includes obtaining stored values corresponding to a subscriber in response to determining that an identification parameter of connection credentials associated with the CPE is valid for the subscriber. The method include providing the stored values to the CPE. Other embodiments of a method are also described.

Embodiments of a computer program product are also described. In one embodiment, the computer program product includes a non-transitory computer readable medium to store a computer readable program. The computer readable program is executed by a processor within a computer, which causes the computer to perform operations for operating a subscriber network. The operations include receiving a message from a CPE. The operations include determining that the CPE is operating in a captive portal. The operations include obtaining stored values corresponding to a subscriber in response to determining that an identification parameter of connection credentials associated with the CPE is valid for the subscriber. The operations include providing the stored values to the CPE. Other embodiments of a computer program product are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
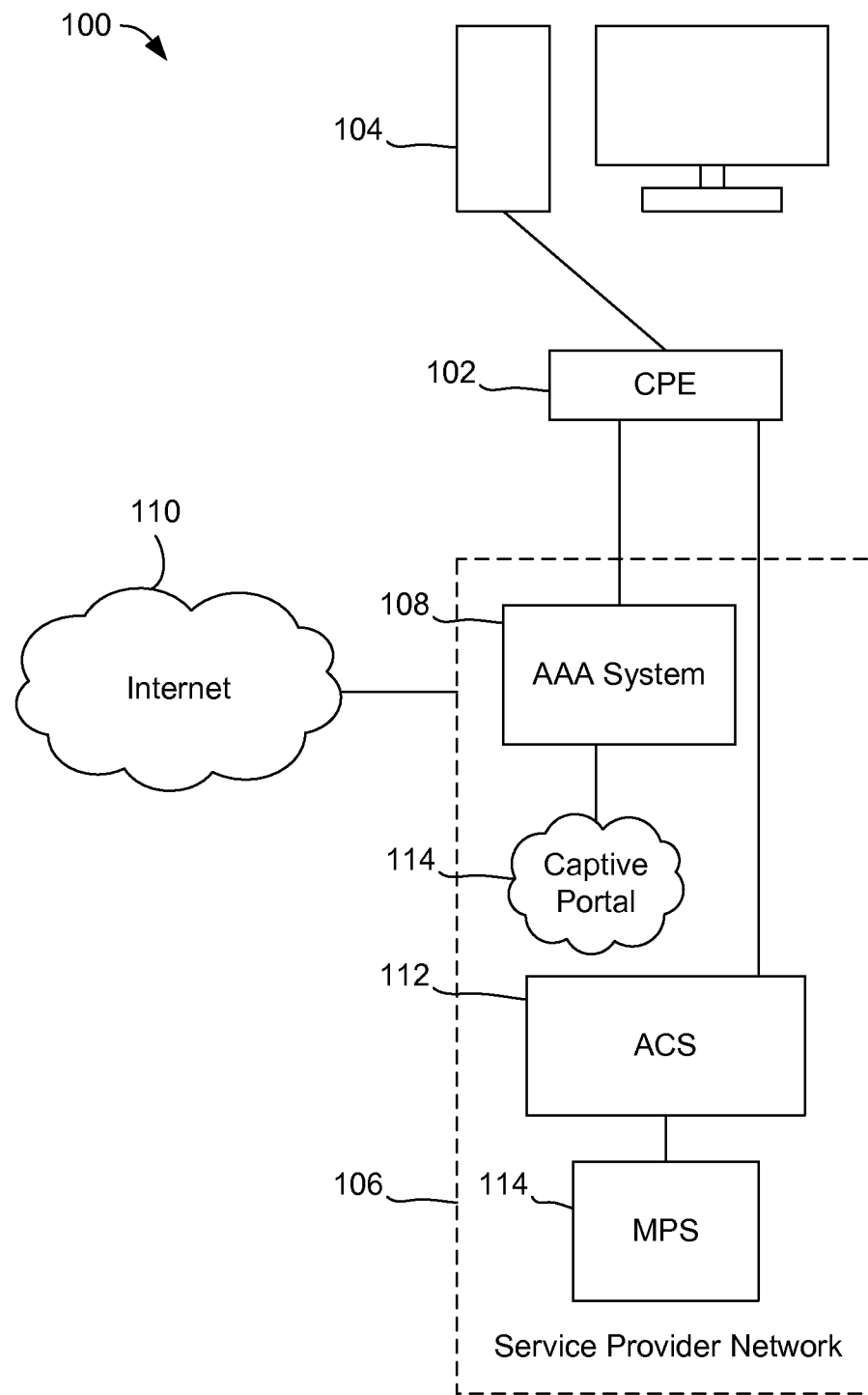
FIG. 1 depicts a schematic diagram of one embodiment of a network communication system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a network communications system. Specifically, the system manages credentials for subscribers and customer-premises equipment (CPE) operated by the subscribers and provides auto-correction for credentials which may have changed for a subscriber's CPE. In an embodiment, the system recognizes when the CPE fails to authenticate with the service provider network—because of the change in credentials—based on the CPE's IP address in a Technical Report 069 (TR-069) event from the CPE. In response to detecting the CPE's failure to authenticate, the system automatically obtains the proper connection credentials for the subscriber associated with the CPE and provides the proper connection credentials to the CPE without interaction by the subscriber or a customer support technician. Connection credentials are used by the service provider to verify that the CPE attempting to connect to the network is authorized, for example in point-to-point protocol (PPP) connections including PPP-over-Ethernet (PPPoE) connections. Digital subscriber line (DSL) networks often assign PPPoE credentials to CPEs. The PPPoE credentials may include a PPPoE username and a PPPoE password. Other types of connection credentials or identification parameters may be used in other types of connections. In some embodiments, the auto-correction includes verifying the validity of one or more parameters of the credentials associated with the CPE and providing correct credentials to be applied to the CPE.

As used herein, the term "CPE" is broadly interpreted to include any equipment located at a subscriber's premises and connected with a service provider's network communication equipment. In some embodiments, the service provider's network communication equipment is connected to the CPE at a demarcation point that separates the CPE from the service provider's equipment at the distribution site. The demarcation point may include a device such as a network interface device (NID) mounted on a building or at some other location on or near the customer's premises that is easily accessible to technicians or others who may need access to the NID. The CPE may include routers, modems, switches, residential gateways, and other equipment located at a subscriber's location that allows the subscriber to communicate with the service provider's network. A residential gateway, in one embodiment, connects a local area network (LAN) with the wide area network (WAN) operated by the Internet service provider (ISP) or other communications service provider. In some instances, the WAN includes a connection to the Internet.

The connection credentials associated with CPE may be changed, for example by a subscriber logging into a residential gateway and mistakenly thinking that the credentials correspond to a wireless security password or the like. When the subscriber then attempts to connect to the Internet, the subscriber may be blocked from accessing the Internet due to failure of the CPE to authenticate with the service provider's network. Before being able to access the Internet, the subscriber may need to restore the correct credentials to the CPE.

In some conventional approaches, when CPE connection credentials are changed, the credentials must be changed manually. For example, when the CPE fails to authenticate, the CPE is placed in the captive portal and the subscriber's browser window may be directed to a specific webpage in the captive portal with a prompt to enter the PPPoE username and PPPoE password. Because the subscriber may not know the PPPoE credentials, the subscriber may need to contact the service provider to obtain the correct credentials. In another embodiment, the subscriber may manually correct the credentials according to steps and information provided by the service provider. Requiring manual correction of the credentials used to authenticate the CPE with the service provider may be time consuming for the subscriber and ties up customer support at the service provider. This may be especially frustrating when a subscriber needs access to the Internet (and/or other service provider services whose access is managed using the credentials—e.g. PayTV, voice-over-IP (VoIP), Home Security, etc. . . . ), but cannot until the credentials have been corrected.

Consequently, providing a system and method for automating the correction of credentials associated with a subscriber's CPE by leveraging existing system capabilities may reduce the amount of time required by the subscriber and the service provider to correct the credentials without requiring additional software or hardware at the subscriber's location. For example, by leveraging the TR-069 protocol, the system is able to obtain data needed to automatically retrieve valid credentials for the subscriber and provide the credentials to the CPE with capabilities that already exist in the service provider network. TR-069 is a technical specification produced by the DSL Forum (later renamed the Broadband Forum) for communicating between an Auto Configuration Server (ACS) and a CPE. The ACS is configured for secure auto-configuration of the CPE and other management functions for the CPE within the common framework with the TR-069 protocol. The TR-069 protocol includes functionality to implement the operations for automatically correcting PPPoE credentials at a CPE, as described herein.

FIG. 1 depicts a schematic diagram of one embodiment of a network communication system 100. In various embodiments, the network communication system 100 includes a DSL system, a cable system, or other type of network communication system 100. The network communication system 100 may include a subscriber model through which customers may pay for Internet access and/or other communication services.

In one embodiment, the network communication system 100 includes a CPE 102 at each subscriber's location. The CPE 102 allows customer devices 104 to connect to the service provider network 106. The service provider network 106 includes an authentication, authorization, and accounting (AAA) system 108 which authenticates each CPE 102 connected to the service provider network 106 before allowing the CPEs 102 to access the Internet 110. Each CPE 102 may be assigned connection credentials that allow the CPE 102 to gain access to the services provided by the service provider. The credentials assigned to each CPE 102 may be unique and may be associated with the subscriber, such that the AAA service is able to determine whether the credentials for a particular CPE 102 match the credentials for a specified subscriber. One example of connection credentials that may be used in a DSL network includes PPP or PPPoE credentials, including a PPPoE username and a PPPoE password. The PPPoE credentials may be stored on a modem at a subscriber's residence, for example. Any time the modem attempts to authenticate on the DSL network, the PPPoE credentials are retrieved from the modem.

If the CPE 102 properly authenticates, the AAA system 108 allows the CPE 102 to access the Internet 110. In one embodiment, the AAA system 108 determines that the CPE credentials are correct and issues or instructs another device to issue an Internet Protocol (IP) address to the CPE 102 that allows the CPE 102 to access the Internet 110. In one embodiment, the AAA system 108 instructs a provisioning server to issue the IP address to the CPE 102. If the CPE 102 does not properly authenticate, the AAA system 108 places the CPE 102 in a virtual holding area that only grants the CPE 102 access to certain portions of the service provider network 106. In one embodiment, the holding area is referred to as a captive portal 114 or a walled garden. Each CPE 102 may be initially placed in the captive portal before authenticating for the first time and the AAA system 108 may require the CPE 102 to authenticate with the AAA system 108 before accessing any IP address other than an IP address or list of IP addresses specified in the captive portal 114. Thus, while in the captive portal 114, the CPE 102 does not have Internet access. For example, when a subscriber first connects a modem to the service provider network 106, the modem may only be able to access a limited set of IP addresses explicitly allowed in the captive portal 114, such as an authentication webpage or a holding webpage until authentication is successful. Once the CPE 102 is authenticated, the CPE 102 is able to gain access outside the captive portal 114, including the Internet 110.

In one embodiment, after determining that the CPE credentials are not correct, the AAA system 108 issues an IP address to the CPE 102 that the service provider network 106 recognizes as a captive portal IP address. The IP address may be located within a range of addresses assigned to the captive portal 114, such that any CPE 102 having an IP address within the range of addresses is recognized by components of the service provider network 106 as being held in the captive portal 114. Until the CPE 102 can obtain a new IP address outside the range of addresses, the CPE 102 will continue to be held in the captive portal 114 and will not be able to access the Internet 110.

In one embodiment, after being assigned an IP address in the captive portal range of addresses, the CPE 102 automatically contacts an ACS 112 in the service provider network 106. The CPE 102 may include software or firmware that is configured to recognize that a connection parameter—such as the IP address—for the CPE 102 has changed. The software or firmware may also be configured to automatically contact the ACS 112 in response to detecting a change in the connection parameter. The ACS 112 checks the IP address to determine whether the CPE 102 is in the captive portal range of addresses and determines whether at least one parameter of the credentials is valid by verifying that the parameter is registered for the subscriber.

In one embodiment in which the service provider is a DSL provider using a PPPoE connection for the CPE, the parameter is a PPPoE username assigned to the subscriber and applied to the CPE by the DSL provider. The parameter may be another parameter assigned to the CPE by the DSL provider. In other embodiments, the verified parameter corresponds to the type of connection used by the service provider to connect to the CPE (for example, an identifier for a specific telephone line). In a further embodiment, the parameter is a manufacturing serial number or similar unique identifier or a unique certificate stored in the CPE. If the parameter is valid, the ACS 112 fetches the correct credentials for the subscriber and returns the correct credentials to the CPE 102. The ACS 112 may retrieve the correct credentials from a system or storage device 114 external to the ACS 112. The correct credentials may be applied to the CPE 102, and the CPE 102 is able to re-authenticate with the AAA system 108. After authenticating with the AAA system 108, the CPE 102 receives a valid IP address outside the range of captive portal addresses and is able to access the Internet 110.

Figure 2:
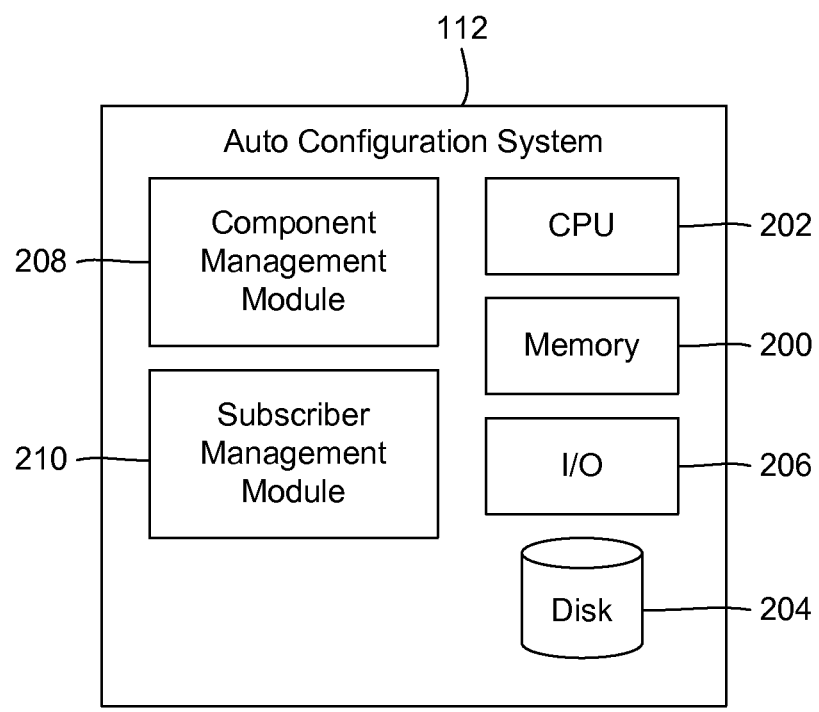
FIG. 2 depicts a schematic diagram of one embodiment of the auto configuration server (ACS) of FIG. 1.
Figure 3:
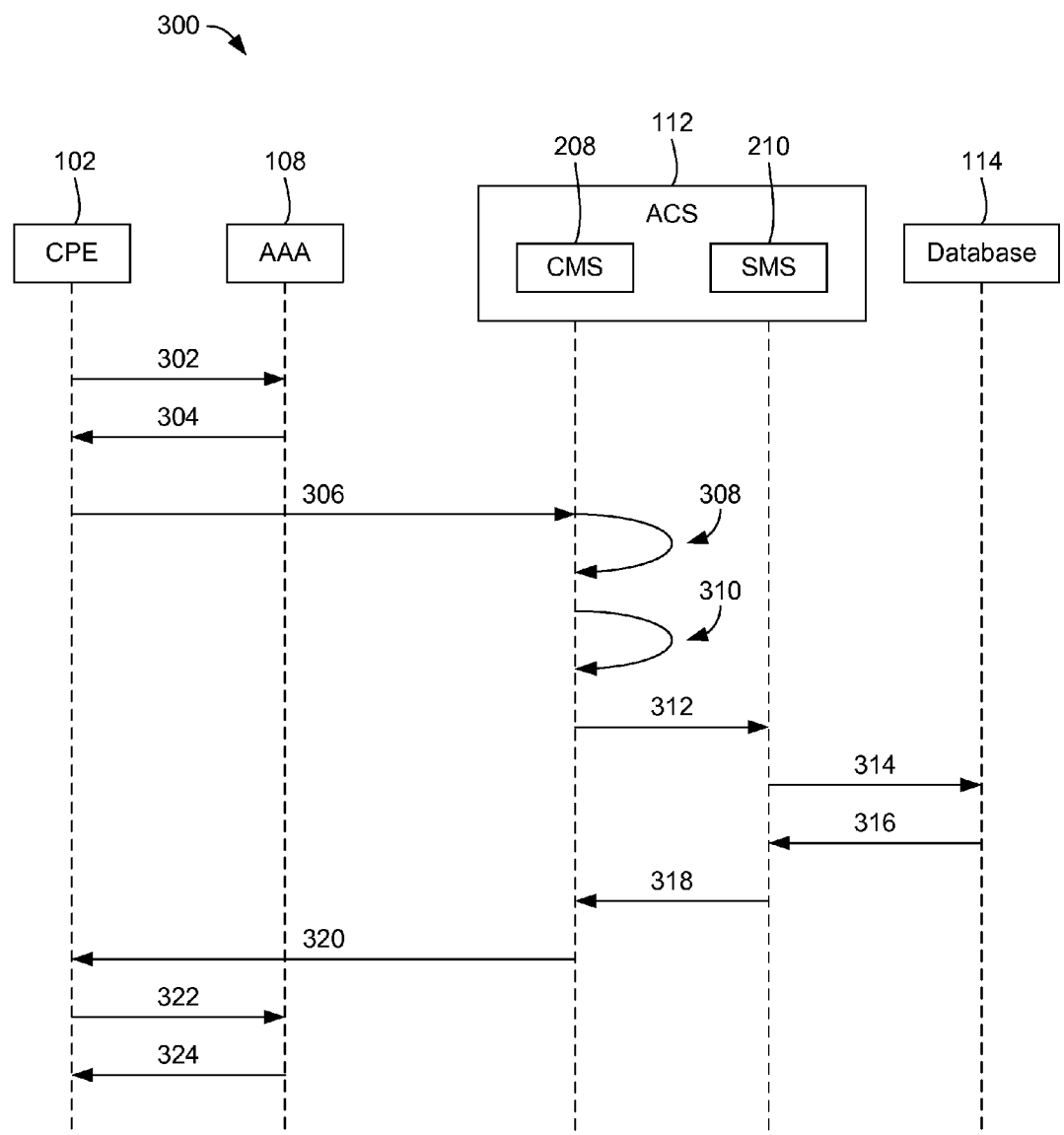
FIG. 3 depicts a messaging timeline of one embodiment of a method of auto-correcting credentials for network subscriber equipment.
Figure 4:
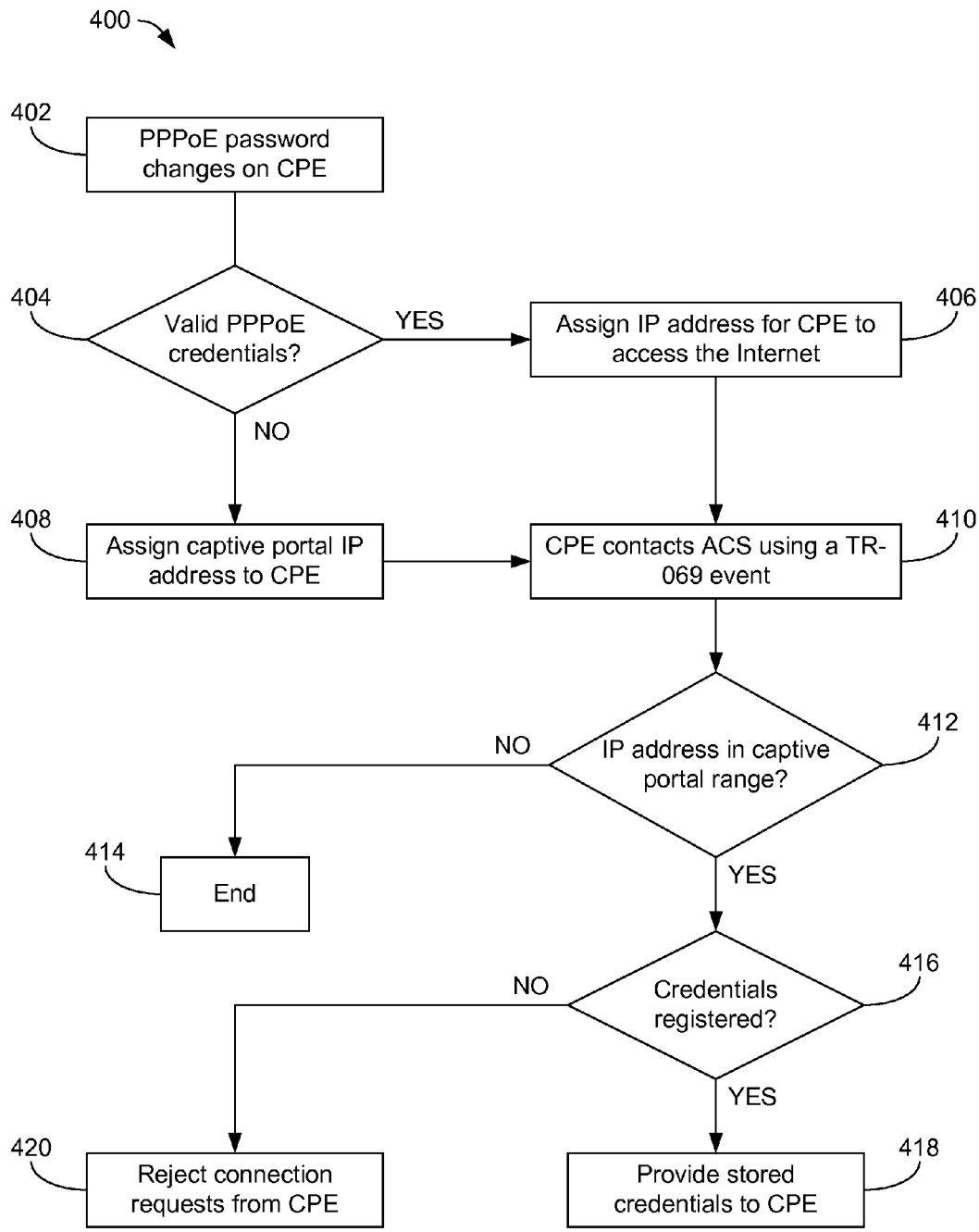
FIG. 4 depicts a flowchart diagram of another embodiment of a method of auto-correcting credentials for network subscriber equipment.

FIG. 2 depicts a schematic diagram of one embodiment of the ACS 112 of FIG. 1. The depicted ACS 112 includes various components, described in more detail below, that are capable of performing the functions and operations described herein. In one embodiment, at least some of the components of the ACS 112 are implemented in a computer system. For example, the functionality of one or more components of the ACS 112 may be implemented by computer program instructions stored on a computer memory device 200 and executed by a processing device 202 such as a CPU. The ACS 112 may include other components, such as a disk storage drive 204, input/output devices 206, a component management module 208, and a subscriber management module 210. Some or all of the components of the ACS 112 may be stored and/or implemented on a single computing device or on a network of computing devices, including a wireless communication network. The ACS 112 may include more or fewer components or subsystems than those depicted herein. In some embodiments, the ACS 112 may be used to implement the methods described herein as depicted in FIGS. 3 and 4.

In one embodiment, the component management module 208, also referred to herein as a component management system (CMS), communicates with devices connected to the service provider network 106. Each CPE 102 connected to the service provider network 106 may be configured to communicate with the CMS 208 in response to changes made at the CPE 102, for example, if the IP address assigned to the CPE 102 is changed. The CMS 208 may verify parameters associated with the CPE 102, such as the connection credentials, the IP address, and other identifying or operating information for the CPE 102.

The CMS 208 may communicate with the subscriber management module 210, also referred to herein as a subscriber management system (SMS), to verify the information associated with the CPE 102. In one embodiment, the SMS 210 manages subscriber information for subscribers on the service provider network 106. The SMS 210 stores or has access to subscriber connection credentials assigned by the service provider to the subscribers. Thus, if the credentials for a particular CPE 102 are corrupted or otherwise changed, the SMS 210 may obtain the correct credentials for the CPE 102. In one embodiment, the connection credentials are stored in a separate database, such that the SMS 210 contacts the separate database to retrieve the stored connection credentials for a particular subscriber. In other embodiments, the CMS 208 and SMS 210 may perform additional operations, or the operations may be performed solely by or in other combinations of the CMS 208, SMS 210 or another component.

The memory device 200 may be random access memory (RAM) or other type of volatile or non-volatile memory used by the ACS during operation of the auto-correction process. In some embodiments, data accessed by the CMS 208 or SMS 210 may be stored on the memory device 200 or on more than one memory device 200 associated with one or more computing devices while processing. The CMS 208 and SMS 210 may be stored/performed on the same or separate computing devices. The operations performed by the CMS 208 or SMS 210 may be performed by the CPU. In some embodiments, the operations may be performed by more than one CPU associated with one or more computing devices. Software to perform the operations for the CMS 208 and SMS 210 may be stored on the disk storage drive 204, which may be a non-volatile or persistent storage device for storing data persistently.

FIG. 3 depicts a messaging timeline of one embodiment of a method 300 of auto-correcting credentials for network subscriber equipment. Although the method 300 is described herein in conjunction with the network communication system 100 of FIG. 1 and the ACS 112 of FIG. 2, the method 300 may be used in conjunction with any network communication system 100 and/or ACS 112. The method 300 allows the CPE 102 to automatically obtain connection credentials for the network communication system 100 without manual correction by the subscriber or customer support for the service provider.

In one embodiment, the CPE 102 contacts 302 the AAA system 108 for authentication on the service provider network 106. The AAA system 108 may be configured to prevent unauthorized access to the Internet 110 via the service provider's network. To authenticate with the AAA system 108, the CPE 102 sends the connection credentials to the AAA system 108. In one embodiment, the connection credentials include a username and a password assigned to the subscriber by the service provider.

If the connection credentials match the connection credentials associated with the subscriber, the CPE 102 is properly authenticated and the AAA system 108 assigns a valid IP address to the CPE 102 which allows the CPE 102 to access the Internet 110. If the connection credentials do not match the connection credentials associated with the subscriber, the CPE 102 is not authenticated and the AAA system 108 places 304 the CPE 102 into a captive portal 114 or walled garden. In one embodiment, the CPE 102 is placed in the captive portal 114 by assigning an IP address to the CPE 102 that the service provider network 106 recognizes as an IP address associated with the captive portal 114. For example, the IP address may be in a range of addresses that are assigned to the captive portal 114. Any CPE 102 with an IP address within the range of addresses will be held in the captive portal 114. In one embodiment, the AAA system 108 places the CPE 102 in the captive portal 114 and stores a record that indicates the CPE 102 is in the captive portal 114. The AAA system 108 also applies an IP address to the CPE 102 within the range of addresses associated with the captive portal 114 so that other components of the service provider network 106 are able to recognize that the CPE 102 is in the captive portal 114. In one embodiment, new CPEs 102 connected to the service provider network 106 are first assigned an IP address associated with the captive portal 114 until the respective CPE 102 is authenticated via the AAA system 108. In one embodiment, when the AAA system 108 successfully authenticates the CPE 102, the AAA system 108 further requests and records additional verification parameters for the CPE 102 (such as a manufacturing serial number) or provides a certificate that can be stored in the CPE 102. In one embodiment, CPEs 102 connected to the service provider network 106 re-authenticate with the AAA system 108 any time one of the connection credentials is changed.

When a CPE 102 is assigned a new IP address, the CPE 102 may be configured to automatically contact 306 the ACS 112 to notify the ACS 112 of the change. In one embodiment, the ACS 112 is configured to automatically identify that the change has occurred by checking the IP address assigned to the CPE 102 when the CPE 102 sends any message to the ACS 112. The message may include an indication that a connection parameter at the CPE has changed. The ACS 112 receives the notification or indication and determines 308 if the CPE 102 falls in the captive portal 114. In one embodiment, the CMS 208 determines that the IP address assigned to the CPE 102 falls within a range of address associated with the captive portal 114. The ACS 112 also determines 310 whether the connection credentials for the CPE 102 are registered in the CMS 208. In one embodiment, the ACS 112 matches a certain parameter of the credentials to a stored list of subscriber credentials to determine whether the parameter is registered in the CMS 208. The parameter may be, for example, a PPPoE username for a DSL network.

If the parameter associated with the CPE 102 is registered in the CMS 208, the ACS 112 retrieves 312 the correct credentials for the subscriber. The CMS 208 and the SMS 210 may be implemented in separate systems or components of the ACS 112. In one embodiment, the CMS 208 contacts the SMS 210 after verifying that the parameter is registered and the CMS 208 sends the verified parameter to the SMS 210. The SMS 210 may use the verified parameter to obtain subscriber information for the verified parameter. The SMS 210 may store a mapping of subscribers to PPPoE usernames, for example.

Using the subscriber information, the SMS 210 may then obtain the stored parameters for the subscriber associated with the credentials from the CPE 102. In one embodiment, the correct credentials are stored in a separate system or database, such as the credentials 114 shown in FIG. 3. The SMS 210 sends 314 a request to the credentials database 114 for the valid credentials and the credentials database 114 returns 316 the credentials to the SMS 210. The CMS 208 retrieves 318 the credentials from the SMS 210 and then provides the valid credentials to the CPE 102.

The valid credentials may then be applied 320 to the CPE 102 by changing the current credentials stored at the CPE 102 with the credentials provided by the ACS 112. In one embodiment, the CPE 102 applies only some of the credentials, for example, the PPPoE password. After the credentials are applied to the CPE 102, the CPE 102 re-authenticates 322 with the AAA system 108. If the authentication is successful, the AAA system 108 removes the CPE 102 from the captive portal 114 and applies 324 a valid IP address to the CPE 102 which allows the CPE 102 to access the Internet 110.

FIG. 4 depicts a flowchart diagram of another embodiment of a method 400 of auto-correcting credentials for network subscriber equipment. Although the method 400 is described in conjunction with the network communication system 100 of FIG. 1 and the ACS 112 of FIG. 2, embodiments of the method 400 may be implemented with other types of network communication systems 100 and configuration systems.

In one embodiment, the PPPoE password changes 402 on the CPE 102. The password may change due to an error by the user—for example, if the user thinks the PPPoE password is a wireless security password—or due to other reasons. An authentication module receives an authentication request from the CPE 102. The system 100 checks 404 if the PPPoE credentials are valid. If the credentials are valid, the authentication module assigns 406 a valid IP address to the CPE 102 to allow the CPE 102 to access the Internet 110. If the credentials are not valid, such that authentication fails, the authentication module assigns 408 a captive portal IP address to the CPE 102. The captive portal IP address may be within a range of addresses corresponding to the captive portal 114 that prevents the CPE 102 from accessing the Internet 110.

When the CPE 102 is assigned a new IP address, either valid or for the captive portal 114, the CPE 102 is configured to contact 410 the ACS 112. In one embodiment, the CPE 102 contacts the ACS 112 using a TR-069 event. For example, the CPE 102 is configured to recognize that the IP address has changed and automatically sends a TR-069 event to the ACS 112 with a "4 VALUE CHANGE" event code, which tells the ACS 112 that the value of one or more parameters has been modified. In one embodiment, the ACS 112 uses an identifier for the CPE 102 to en-queue a list of workflows for execution. The notification also includes the modified parameter, such that if the IP address has changed, the CPE 102 also sends the newly assigned IP address to the ACS 112 with the TR-069 event. In some cases, the CPE 102 may also send the PPPoE credentials to the ACS 112 in a TR-069 event. In one embodiment, the ACS 112 is also able to obtain data from the AAA system 108. After receiving a TR-069 event, the ACS 112 may indicate to the CPE 102 that the TR-069 has been successfully delivered, or the CPE 102 may continue retrying delivery of the TR-069 event until receiving the response from the ACS 112.

After receiving the indication from the CPE 102 that a connection parameter (e.g. the IP address) at the CPE 102 has changed, the ACS 112 determines 412 whether the CPE 102 is operating in the captive portal 114. In one embodiment, determining whether the CPE 102 is in the captive portal 114 includes determining whether the IP address for the CPE 102 is in a range of addresses associated with the captive portal 114. If the IP address is not in the captive portal range, the ACS 112 may end 414 operations for the TR-069 event.

If the IP address is within the captive portal range, the ACS 112 then determines 416 whether the CPE connection credentials associated with the CPE 102 are valid for the subscriber. In one embodiment, the connection credential parameter used to determine whether the credentials are registered includes an identification parameter, such as the PPPoE username. The ACS 112 may check a stored database of subscribers and subscriber usernames to verify that the parameter is registered.

If the identification parameter is registered with the ACS 112, the ACS 112 obtains the stored connection credential values corresponding to the subscriber—for example, the PPPoE password—and provides 418 the stored credential values to the CPE 102. In one embodiment, the stored values are stored at a separate storage device 114 that includes a database of credentials for subscribers in the service provider network 106. The CPE 102 may then apply the provided credential values and may re-authenticate. When the CPE 102 has applied the stored credential values and attempts to re-authenticate with the AAA system 108, the AAA system 108 may assign a new IP address to the CPE 102 in response to determining that the request for authentication is successful. The new IP address provides Internet access to the CPE 102. In one embodiment, if the PPPoE username or other identification parameter is not registered with the ACS 112, the ACS 112 rejects 420 any subsequent connection requests from the CPE 102.

Because the system 100 is configured to detect the connection credentials associated with the CPE 102 and retrieve stored credential values, such as the PPPoE password, for the subscriber associated with the CPE 102 so that the stored credential values may be applied to the CPE 102, the system 100 is able to automatically correct or configure the connection credentials for the CPE 102 by leveraging existing functionality in the service provider network and in particular in the CPE. In a specific embodiment, the system 100 leverages the TR-069 protocol to achieve the auto-correction of the CPE credentials.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

An embodiment of a network communication system 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A network communication system, comprising:
   a computing device comprising:
      a processor;
      a memory device; and
      a component management module configured to:
         receive a message from customer-premises equipment (CPE) when the CPE has determined that an Internet Protocol (IP) address of the CPE has been modified, wherein the message comprises a TR-069 event comprising a "4 VALUE CHANGE" event code including the modified IP address;
         determine from the information in the message that the CPE is operating in a captive portal, wherein the captive portal restricts Internet access to the CPE;
         obtain stored connection credential values corresponding to a subscriber in response to determining that an identification parameter of connection credentials associated with the CPE is valid for the subscriber, wherein the connection credentials comprise a point-to-point protocol over Ethernet (PPPoE) username and a PPPoE password for a digital subscriber line (DSL) network; and
provide the stored credential values to the CPE.

2. The system of claim 1, wherein the stored credential values are stored at a separate storage device comprising a database of credentials for subscribers in a service provider network.

3. The system of claim 1, further comprising an authentication module, wherein the authentication module is configured to:
receive an authentication request from the CPE comprising at least one connection credential parameter; and
assign an Internet Protocol (IP) address within a range of addresses to the CPE in response to determining that the authentication request fails, wherein the range of addresses corresponds to the captive portal.

4. The system of claim 3, wherein the authentication module is further configured to assign a new IP address to the CPE in response to determining that a subsequent request for authentication is successful, wherein the new IP address provides Internet access to the CPE.

5. The system of claim 1, wherein the component management module is further configured to reject subsequent communication requests to the component management module from the CPE in response to determining that the identification parameter is not registered in the component management module.

6. The system of claim 1, wherein determining that the CPE is operating in a captive portal further comprises determining that an Internet Protocol (IP) address of the CPE is within a range of IP addresses assigned to the captive portal, wherein the captive portal restricts Internet access to the CPE.

7. A method for operating a subscriber network, the method comprising:
receiving a message from customer-premises equipment (CPE) when the CPE has determined that an IP address of the CPE has been modified, wherein the message comprises a TR-069 event comprising a "4 VALUE CHANGE" event code including the modified IP address;
determining from the information in the message that the CPE is operating in a captive portal;
obtaining stored connection credential values corresponding to a subscriber in response to determining that an identification parameter of connection credentials associated with the CPE is valid for the subscriber, wherein the connection credentials comprise a point-to-point protocol over Ethernet (PPPoE) username and a PPPoE password for a digital subscriber line (DSL) network; and
providing the stored credential values to the CPE.

8. The method of claim 7, further comprising rejecting subsequent communication requests from the CPE in response to determining that the identification parameter is not registered in the component management module.

9. The method of claim 7, wherein determining that the CPE is operating in a captive portal further comprises determining that an Internet Protocol (IP) address of the CPE is within a range of IP addresses assigned to the captive portal, wherein the captive portal restricts Internet access to the CPE.

10. A computer program product, comprising:
a non-transitory computer readable medium to store a computer readable program, wherein the computer readable program, when executed by a processor within computer, causes the computer to perform operations for operating a subscriber network, the operations comprising:
receiving a message from customer-premises equipment (CPE) when the CPE has determined that an IP address of the CPE has been modified, wherein the message comprises a TR-069 event comprising a "4 VALUE CHANGE" event code including the modified IP address;
determining from the information in the message that the CPE is operating in a captive portal;
obtaining stored connection credential values corresponding to a subscriber in response to determining that an identification parameter of connection credentials associated with the CPE is valid for the subscriber, wherein the connection credentials comprise a point-to-point protocol over Ethernet (PPPoE) username and a PPPoE password for a digital subscriber line (DSL) network; and
providing the stored credential values to the CPE.

11. The computer program product of claim 10, wherein the computer readable program further comprises a component management module,
wherein the component management module is further configured to reject requests to the component management module of the computer executing the computer readable program from the CPE in response to determining that the identification parameter is not registered in the component management module of the computer executing the computer readable program.

12. The computer program product of claim 10, wherein determining that the CPE is operating in a captive portal further comprises determining that an Internet Protocol (IP) address is within a range of IP addresses assigned to the captive portal, wherein the captive portal restricts Internet access to the CPE.

* * * * *